July 10, 1956 T. S. SKILLMAN 2,754,369

SIGNALLING ARRANGEMENTS FOR TELEPHONE SYSTEMS

Filed Oct. 19, 1954 4 Sheets-Sheet 1

*Inventor*
*Thomas S. Skillman*
*by Ward, Neal, Haselton, Orme & McElhannon*
*Attorneys*

Inventor
Thomas S. Skillman
by Ward, Neal, Haselton, Orme & McElhannon
Attorneys July 10, 1956 T. S. SKILLMAN 2,754,369

SIGNALLING ARRANGEMENTS FOR TELEPHONE SYSTEMS

Filed Oct. 19, 1954 4 Sheets-Sheet 3

Inventor
Thomas S. Skillman
by Ward, Neal, Houlton, Orme & McElhannon
Attorneys

July 10, 1956 T. S. SKILLMAN 2,754,369

SIGNALLING ARRANGEMENTS FOR TELEPHONE SYSTEMS

Filed Oct. 19, 1954 4 Sheets-Sheet 4

Inventor
Thomas S. Skillman
by Ward, Neal, Haselton, Orme & McElhannon
Attorneys 2,754,369

SIGNALLING ARRANGEMENTS FOR TELEPHONE SYSTEMS

Thomas S. Skillman, Mosman, near Sydney, New South Wales, Australia, assignor to T. S. Skillman and Company Pty. Limited, Cammeray, near Sydney, New South Wales, Australia, a company of New South Wales Application October 19, 1954, Serial No. 463,237

Claims priority, application Australia October 23, 1953

6 Claims. (Cl. 179—84)

The invention relates to telephone systems and more specifically to the signalling arrangements in those systems in which the control, switching, supervisory or like signals are of so-called "steady state" and are transmitted as alternating currents.

In systems of this kind signals are transmitted in the same way as for direct current signalling, that is to say the signal is transmitted by the change from one steady state to another so that the signalling can be carried out over a trunk line in the same way as over a local line permitting the flow of direct current. Systems are known in which, for example, the voice is transmitted by modulation of carrier frequencies and in which the carrier frequencies themselves are used for signalling purposes. Other systems have been proposed in which a frequency just outside the voice frequency range is used to transmit the necessary signals either on V. F. lines or carrier lines.

The use of the steady state signalling method has several advantages. As mentioned before, the signals can be given over a trunk line in the same way as over a local line thus facilitating the process of signalling from one exchange to any one of a number of distant exchanges; and furthermore this signalling method provides an immunity of the signalling path against voice interference owing to the fact that normally the signal receiver is in its operated condition when voice frequencies are liable to be transmitted and thus cannot be falsely operated thereby.

Although this latter protection is adequate once a call signal has been sent, and after the called subscriber has answered there is, however, one stage in the establishing of a connection where such a protection is not available. This latter case occurs after a call signal has been transmitted but before the supervisory signal, indicating that the called subscriber has answered, is given in the backward direction. During this period operator's conversation can occur, which might operate the signal receiver in the backward direction and thus produce a false supervisory signal. One of the objections to a false supervisory signal is, of course, that these signals are used for operating subscribers' meters once per unit fee, and any false signals would add an additional charge to the subscriber's account.

To overcome these difficulties it has been proposed in the past to send signals with a level higher than the level of the voice frequencies and to use a signal receiver which will respond only to the high level signal current. Such an arrangement, however, can create interferences on the line, which are not permissible.

Another way to overcome the abovementioned difficulties is to use a signal current of lower level and to use sharply tuned filters for the separation of signal and voice frequencies. This latter arrangement is very costly particularly when the signal frequencies are in close vicinity of the transmitted voice frequency band.

According to the invention the abovementioned difficulties are overcome in a telephone system incorporating means to make calling, supervisory, clearing signals and the like in the steady state form in the forward and backward direction respectively, and to transmit these signals as alternating currents, and having for said alternating currents a signal receiver, in which the higher of two levels of alternating signal current is of the same or lower level than the possible peaks of voice energy even after filtering, by the provision of a signalling path in the backward direction which is protected from voice interference prior to the supervisory signal by circuit rearrangements automatically restored by said supervisory signal.

In one embodiment of the invention an attenuating pad is inserted at the sending end of the backward direction which reduces the peak level of the voice frequencies below the level necessary to operate the signal receiver in that direction. When the supervisory signal is given this pad is removed from the speech channel and the normal transmission path is restored.

In another embodiment of the invention the signal receiver in the backward direction is changed in sensitivity by the supervisory signal. The receiver is rather insensitive prior to the supervisory signal so that there is no danger of operation by voice frequencies, but is made sensitive again by a signal current surge sent with the supervisory signal, is operated by this signal current surge and remains operated by a signal current of lower level during conversation; thus full protection against false operation by voice frequencies is obtained for all phases of transmission.

Further details of the invention will be more apparent from the following description in connection with the drawings in which Fig. 1 shows the transmission path of a 4-wire telephone system with an attenuating pad to protect the signal receiver for the backward direction.

Figure 1:
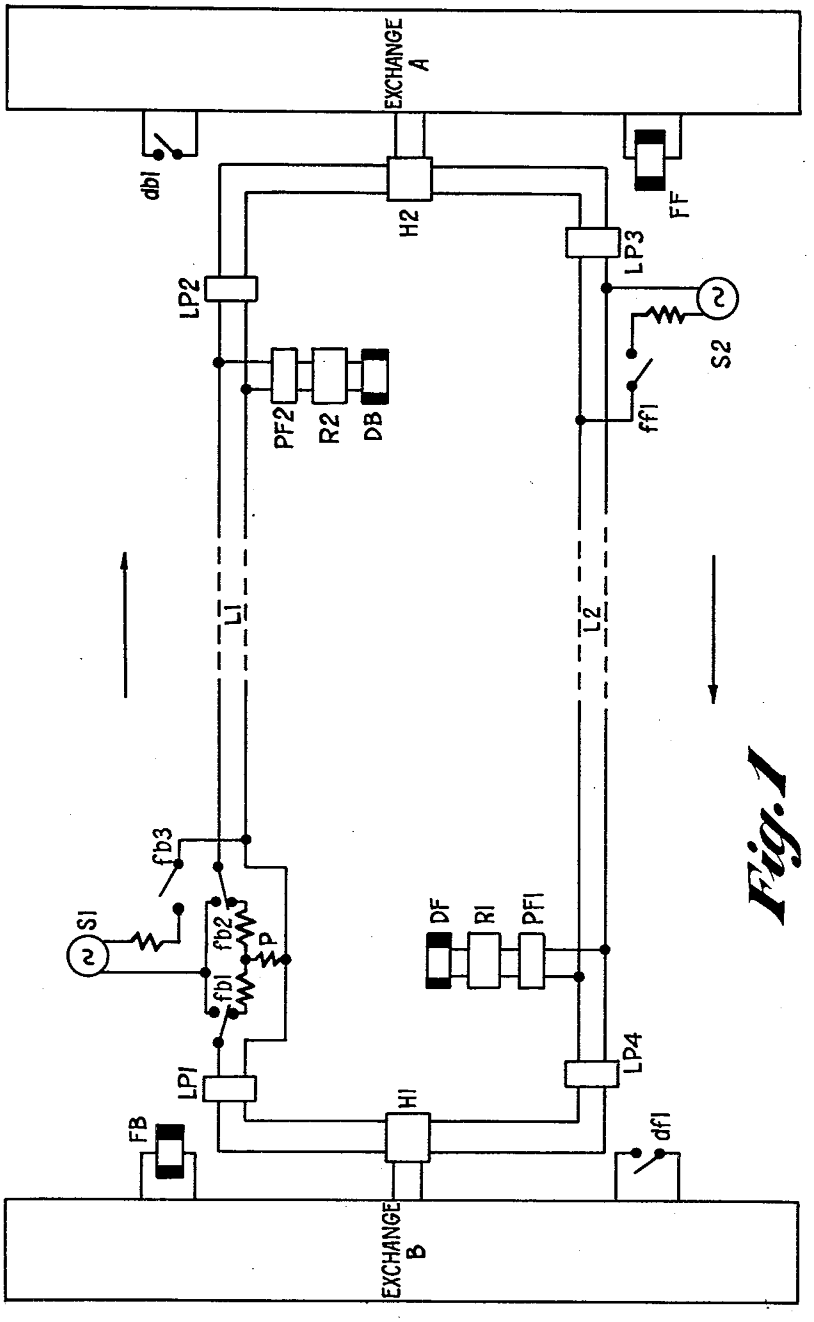

In Fig. 1 a 4-wire circuit or link (including the signalling path and the speech transmission path) between two terminals or telephone exchanges A and B is shown in the state prior to the establishing of a connection. When a subscriber connected to exchange A wants to establish a connection with a subscriber connected to exchange B the relay FF of exchange A is energized in well known manner and closes its contact *ff1* to send a call signal from the source of signal current S2 over the link L2 in the forward direction to the signal receiver R1 of the called exchange B. The signal current passing through band pass filter PF1 and receiver R1 operates in known manner the relay DF, which in turn over operated contact *df1* transmits the call signal into exchange B and thus to the called subscriber. Prior to the answering of the subscriber operator's conversation between exchanges A and B is possible. In the forward direction voice frequencies are transmitted from exchange A over hybrid transformer H2, low pass filter LP3 to link L2 and over low pass filter LP4 and hybrid transformer H1 to exchange B. In the backward direction the transmission of voice frequencies coming from exchange B proceeds over hybrid transformer H1 and low pass filter LP1 to the attenuation pad P, which is connected in the transmission path over relay contacts *ff1* and *ff2* and further over link L1, low pass filter LP2 and hybrid transformer H2 to exchange A.

The signal receiver R2 of exchange A is connected parallel to the link L1 over a high pass or band pass filter PF2. The signal receiver R2 can operate a relay DB which over its contact *db1* can repeat any signals in the backward direction to exchange A and the lines connected therewith.

When the pad P is connected as shown in Fig. 1 it provides an attenuation for the voice frequencies transmitted from B to A which is high enough to prevent the operation of the signal receiver R2 by these transmitted voice frequencies. As the receiver R1 of exchange B was operated previously by the call signal, no false operation of either the signal receiver R1 or R2 can occur during operators' conversation.

As soon as the called subscriber answers relay FB at exchange B is operated in well known manner and in turn operates its contacts *fb*1, *fb*2 and *fb*3. Contacts *fb*1 and *fb*2 remove the attenuating pad P from the transmission path (thus restoring it automatically to the proper attenuation for the main part of the call) and at the same time contact *fb*3 connects the source of alternating signal current S1 with the link L1 to transmit the supervisory signal. As the pad is removed from the line the signal receiver R2 of exchange A will now respond to the comparatively low level signal current transmitted from source S1 and will remain operated during further conversation; thus any false operation of the receiver R2 by voice frequencies is eliminated.

At the end of the conversation relay FB will change over contacts *fb*1 and *fb*2 and temporarily rearrange the circuits to prepare the line for the next call; and remove at contact *fb*3 the signal current from the line thus releasing again the signal receiver R2 and thereby repeating the "clear back" signal to exchange A. In the same manner release of relay FF of exchange A will interrupt the signal current from S2 and release receiver R1 and relay DF.

Figure 2:
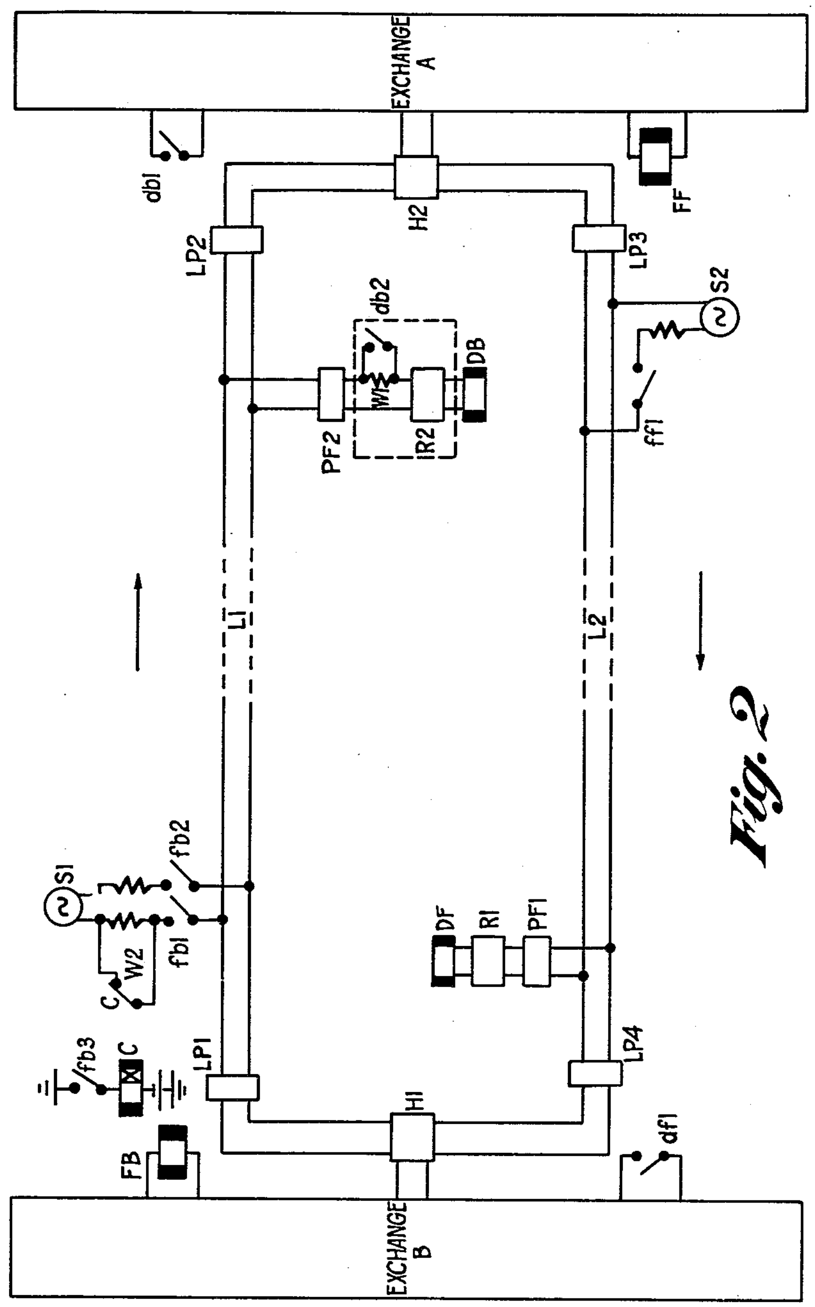
Fig. 2 shows a similar transmission path in which the sensitivity of the receiver is changed.

An arrangement by which sensitivity of the signal receiver of the calling exchange is altered, is shown in Fig. 2. The transmission of a call signal from exchange A to exchange B proceeds in the same manner as described above in connection with Fig. 1. Prior to the sending of a supervisory signal from exchange B back to exchange A relay FB is not operated and the source of signal current S1 is disconnected at contacts *fb*1 and *fb*2 from link L1. Voice frequencies transmitted from exchange B to exchange A over hybrid transformer H1, low pass filter LP1 to link L1 and further over low pass filter LP2 and hybrid transformer H2 to exchange A cannot operate the signal receiver R2 bridged across the line over filter PF2, as this receiver is made less sensitive by the insertion of a resistance W1 (or a corresponding attenuation pad) in the receiver circuit.

When the called subscriber (connected to exchange B) answers relay FB is operated in known manner to give the supervisory signal and closes its contacts *fb*1 to *fb*3. Contacts *fb*1 and *fb*2 connect the signal source S1 to the transmission path L1. As the resistor W2 in series with signal source S1 is short circuited by a contact *c* of relay C a comparatively high signal current is sent over the link L1, which operates the signal receiver R2 over resistor W1 and thus relay DB. Relay DB closes its contacts *db*1 and *db*2. Over contact *db*1 the supervisory signal is passed in to the exchange A, and over contact *db*2 the circuit rearrangement is restored automatically by the supervisory signal, namely the resistor W1 is short circuited, so that the receiver R2 is now restored to full sensitivity and will respond to a lower level of signal current.

At the same time contact *fb*3 of relay FB automatically restores (with a time lag) further circuit rearrangements. The contact *fb*3 has closed a circuit for the slow operating relay C which after several milliseconds operates opening its contact *c* and inserting resistor W2 in the signal circuit from signal source S1. Thus the level of the signal current is reduced back to the proper steady state level, but as the receiver R2 is now more sensitive owing to the short circuit across resistor W1 by contact *db*2 the lower level signal current will still maintain the receiver R2 in the operated condition during conversation. At the end of the conversation relay FB opens again its contacts *fb*1 to *fb*3, disconnects the signal source S1 from the transmission path and releases relay C. This effects the (temporary) circuit rearrangements required at the incoming end in preparation for the next call.

At the other end (at exchange A) signal receiver R2 releases relay DB and switches resistor W1 (or a corresponding pad) back into the circuit which is thus rearranged ready for the reception of the next supervisory signal.

As the surge of the signal current is transmitted over the link for only a very short period no undue interference by the signal current can occur in the transmission path. During normal conversation the signal current is kept at low level, but nevertheless full protection of the signal receivers against false operation by voice frequencies is provided.

Figure 3:
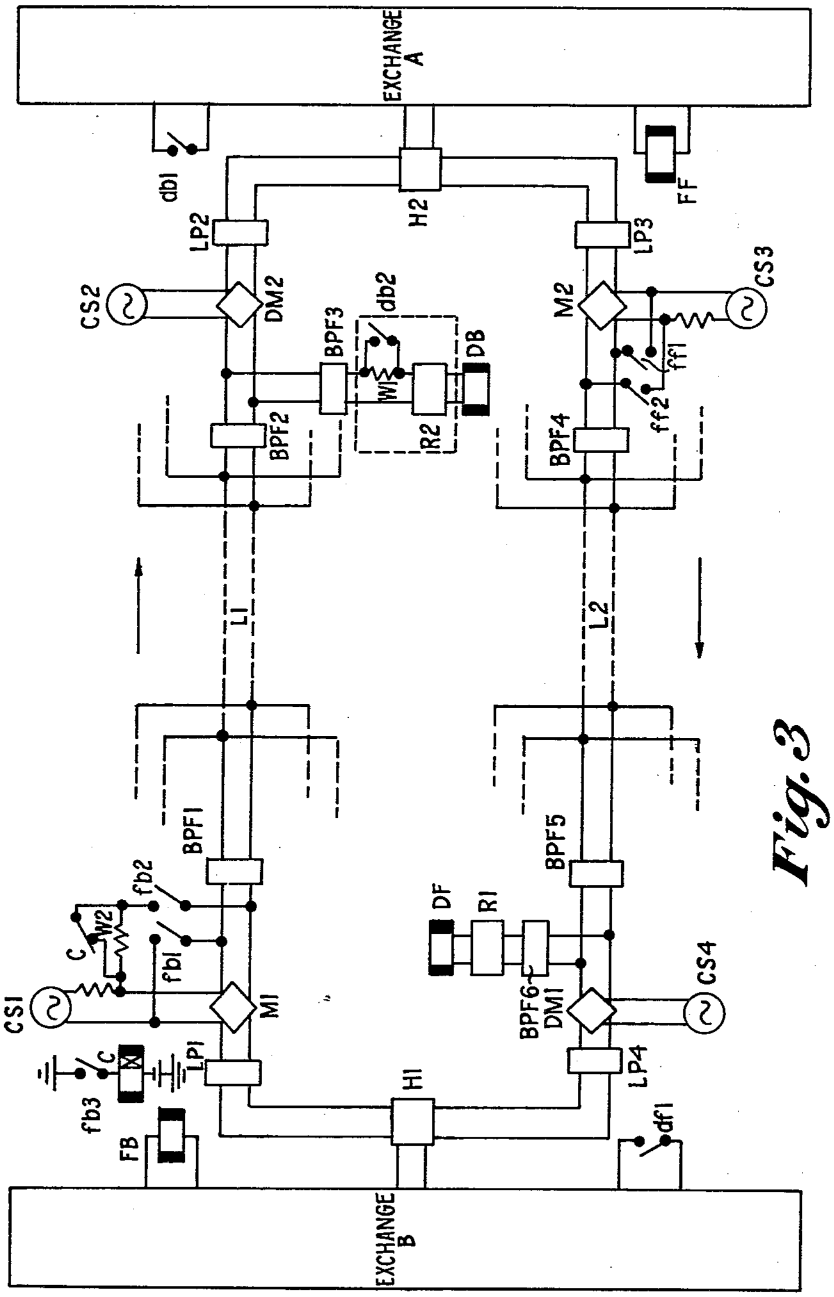
Fig. 3 shows the application of the arrangement of Fig. 2 to a multi-channel carrier telephone system.
Figure 4:
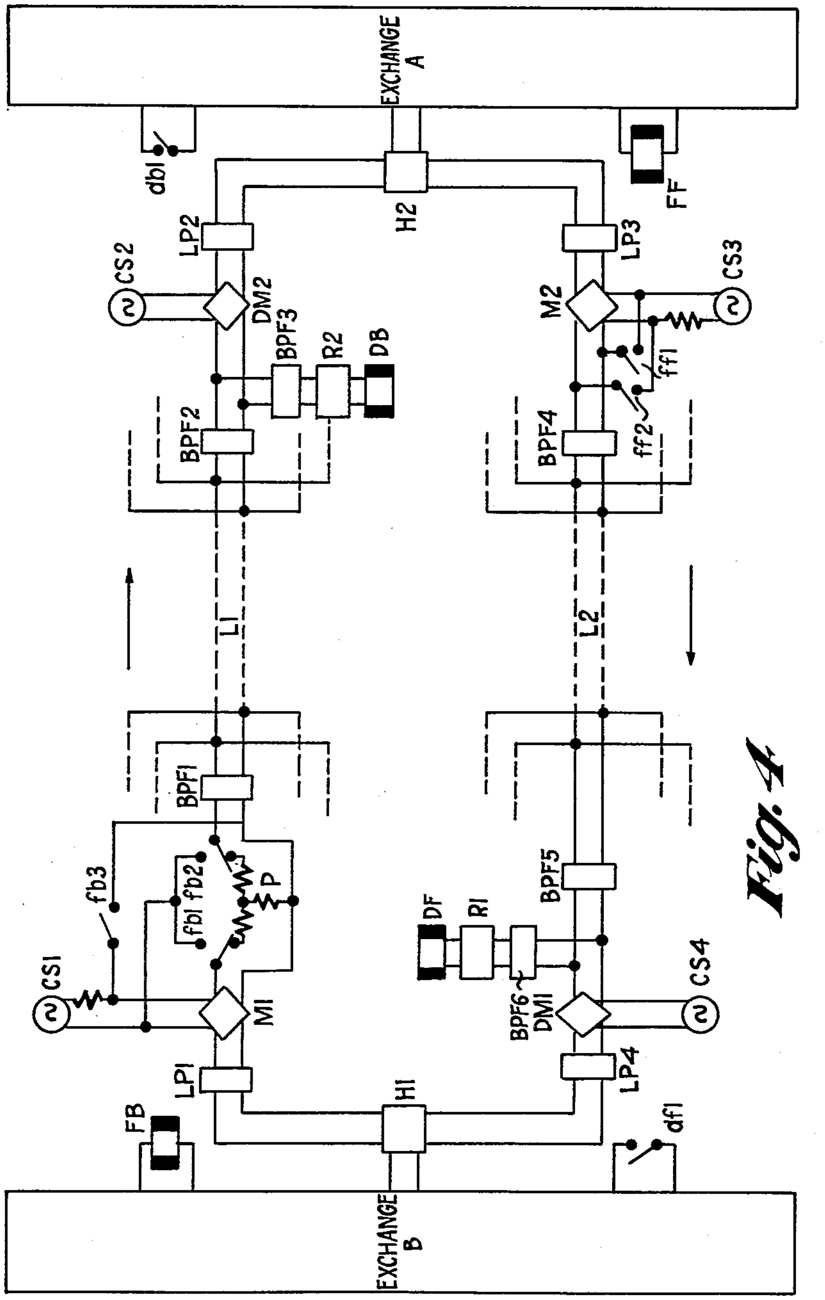
Fig. 4 shows the application of the arrangement of Fig. 1 to a multi-channel carrier telephone system.

Fig. 3 shows the application of the invention to a multichannel carrier telephone system using the carrier frequency of each channel for signalling over this channel. The arrangement corresponds to the embodiment shown in Fig. 2 using a signal surge to operate the signal receiver and restore its sensitivity, but the embodiment of Fig. 1 can be applied in the same way to carrier transmission systems as shown in Fig. 4. Similarly there is no difference in principle in using other frequencies for signalling, for example, an audio frequency outside the speech band which would be passed through the modulator and demodulator respectively to operate the signal receiver in the described manner.

In Fig. 3 a call is initiated in known manner from a channel by the operation of relay FF of exchange A which closes its contacts *ff*1 and *ff*2 and thus connects the source of carrier frequency CS3 to the transmission path. The carrier frequency, transmitted for signalling purposes only, passes over band pass filter BPF4, the common link L2, the corresponding band pass filter BPF5, and band pass filter BPF6 to the signal receiver R1 which operates relay DF and transmits at contact *df*1 the call signal into exchange B. Conversation prior to the supervisory signal (answering of the called subscriber) can be carried out in the forward direction from exchange A over hybrid transformer H2, low pass filter LP3 to modulator M2. This modulator is balanced so that the carrier frequency supplied from source CS3 does not appear in the output circuit of the modulator. From the two sidebands resulting from modulation one sideband is suppressed and the other sideband is transmitted over band pass filter BPF4, the link L2 and band pass filter BPF5 to the demodulator DM1 connected with a source of carrier current CS4. As the signal receiver R1 is already operated by the carrier frequency from CS3 the transmitted sideband cannot influence the signal receiver. The demodulated voice frequencies pass from demodulator DM1 over low pass filter LP4 and hybrid transformer H1 to exchange B.

In the backward direction the voice frequencies from a channel, after passing the hybrid transformer H1 and low pass filter LP1, are modulated in the modulator M1 by the carrier frequency from the source CS1 and one sideband of the modulated frequencies is then transmitted through a corresponding band pass filter BPF1 to the link L1. On the other end the modulated frequencies pass through a corresponding band pass filter BPF2 to demodulator DM2, are demodulated by the carrier frequency from source CS2, and the voice frequencies are then transmitted over the low pass filter LP2 and hybrid transformer H2 to the exchange A.

Between band pass filter BPF2 and demodulator DM2 the signal receiver R2 is connected to the transmission path over a band pass filter BPF3. Prior to the supervisory signal the signal receiver is made rather insensitive by reason of resistor W1 being inserted in the circuit and thus any operator's conversation will not affect the signal receiver as described above in connection with Fig. 2.

As soon as the supervisory signal is initiated at exchange B by the operation of relay FB to transmit this signal in the backward direction to exchange A the carrier frequency from source CS1 is connected over contacts $fb1$ and $fb2$ to the channel at a comparatively high level, is transmitted over link L1 and operates the signal receiver R2 and thus relay DB. As described above the signal receiver R2 restores its fully sensitivity by short circuiting resistor W1 at contact $db2$ and at the same time the level of the carrier frequency from CS1 is reduced to the proper steady state level by the delayed operation of relay C, opening contact $c$ and inserting resistor W2 in the signal current circuit.

Further subscriber's conversation can have no influence on the signal receiver R2 which remains operated by the low level carrier frequency transmitted from CS1 while the conversation is in progress.

Although Fig. 3 shows an arrangement in which the carrier frequency itself is suppressed in the modulators M1 and M2 and is reintroduced in the demodulator DM1 and DM2 the invention can be applied in the same manner in cases where the carrier frequency is transmitted together with one sideband but at a lower level prior to the supervisory signal than the full strength (required for full modulation) which is preferable after this signal.

In Fig. 4 a multi-channel carrier telephone system is shown in which the protection of the signal receiver in the backward direction against voice operation prior to the supervisory signal is achieved by the insertion of an attenuation pad as shown in Fig. 1.

A call is initiated in the forward direction from exchange A to exchange B as described above in connection with Fig. 3 by the transmission of the carrier frequency from source CS3 to the signal receiver R1. Operators' conversation proceeds from exchange A to exchange B also as described above. In the backward direction, however, the sidebands obtained at the output of modulator M1 from modulated voice frequencies are passed over the attenuation pad P, inserted in the transmission path by contacts $fb1$ and $fb2$ of relay FB, to the band pass filter BPF1 which suppresses one of the sidebands. As the sideband level has been reduced by the attenuation pad P the sideband frequencies transmitted over link L1 and band pass filter BPF2 cannot falsely operate the signal receiver R2, but are sufficient to be demodulated in the demodulator DM2. The resultant voice frequencies are passed over low pass filter LP2 and hybrid transformer H2 into exchange A thus enabling a conversation between operators at Exchanges A and B.

When the called subscriber answers and the corresponding supervisory signal is given by the operation of the relay FB the carrier frequency from source CS1 is connected at contact $fb3$ with the transmission path and at the same time the pad P is taken out of circuit at the contacts $fb1$ and $fb2$. One of the sidebands of the modulated carrier frequency is now transmitted with full strength over the link L1 but as the receiver R2 is now operated over band pass filter BPF3 by the carrier frequency transmitted from source CS1 the transmitted sideband cannot effect any false operation of the signal receiver. At the end of the conversation relay FB releases and switches pad P again into the circuit.

Although described above in connection with a multichannel carrier telephone system the invention can be applied in the same way to a single channel carrier telephone system, and in this case the band pass filters BPF1, BPF2, BPF4 and BPF5 can be omitted.

The foregoing description gives only some embodiments of the invention, but the invention is not restricted to these embodiments. Further variations or modifications of the (temporary) circuit rearrangements are possible within the scope of the invention to protect the signalling path in the backward direction against false operation prior to giving the supervisory signal.

By the invention false operation of the signal receiver is prevented although the various filters such as PF1, PF2 (Figs. 1 and 2) and BPF3, BPF6 (Figs. 3 and 4) can have such low discrimination against voice in the pass range of the speech channel that speech peaks at the receiver sometimes exceed the level of signalling current, and the filters such as LP1 in Fig. 1 and Fig. 2 can have such low discrimination at the signalling current frequency (outside the speech pass band) that the signal current level in the receiver is sometimes exceeded by voice currents leaking through the filter. The filters are therefore cheaper, and the whole system is more economical, than in the case where the speech and signal frequencies are completely separated by sharply tuned filters.

I claim:

1. In a telephone system having a first terminal, a second terminal and a transmission path including a forward and a backward signalling path between said terminals to establish selected connections between said terminals, a signal receiver at each said terminal, a source of alternating signal current and signal means at said first terminal to transmit said alternating current at a predetermined level as a call signal over said forward signalling path to said signal receiver at said second terminal, said level being maintained during any said connection and being reduced for the transmission of a forward clearing signal; a further source of alternating signal current and further signal means at said second terminal to transmit said lastmentioned alternating current at a predetermined level as a supervisory signal over said backward signalling path to said signal receiver at said first terminal after a selected connection has been established, said lastmentioned level being maintained during any said connection and being reduced for the transmission of a backward clearing signal, each said signal receiver being responsive only to said predetermined levels of said call and said supervisory signal respectively, said predetermined levels being lower than possible peaks of voice energy transmitted over said transmission path and reaching said receivers, and means included in said backward signalling path and operable by said further signal means to protect said signal receiver at said first terminal in the backward signalling path against voice interference prior to the transmission of said supervisory signal.

2. In a telephone system having a first terminal, a second terminal and a transmission path including a forward and a backward signalling path between said terminals to establish selected connections between said terminals, a signal receiver at each said terminal, a source of alternating signal current and signal means at said first terminal to transmit said alternating current at a predetermined level as a call signal over said forward signalling path to said signal receiver at said second terminal, said level being maintained during any said connection, and being reduced for the transmission of a forward clearing signal; a further source of alternating signal current and further signal means at said second terminal to transmit said lastmentioned alternating current at a predetermined level as a supervisory signal over said backward signalling path to said signal receiver at said first terminal after a selected connection has been estblished, said lastmentioned level being maintained during any said connection and being reduced for the transmission of a backward clearing signal, each said signal receiver being responsive only to said predetermined levels of said call and said supervisory signal respectively, said predetermined levels being lower than possible peaks of voice energy transmitted over said transmission path and reaching said receivers, attenuating means connectable into the backward signalling path at said second terminal and switching means and electrical connections therefrom to said attenuating means, said backward signalling path and said further signal means at said second terminal to connect said attenuating means into said backward signalling path during periods in which no signal current is transmitted by said further signal means to reduce the peak level of transmitted voice energy below the operate level of said signal receiver at said first terminal in the backward signaling path and to take said attenuating means out of circuit by the operating of said further signal means at said second terminal transmitting said supervisory signal.

3. In a telephone system having a first terminal, a second terminal and a transmission path including a forward and a backward signalling path between said terminals to establish selected connections between said terminals, a signal receiver at each said terminal, a source of alternating signal current and signal means at said first terminal to transmit said alternating current at a predetermined level as a call signal over said forward signalling path to said signal receiver at said second terminal, said level being maintained during any said connection and being reduced for the transmission of a forward clearing signal; a further source of alternating signal current and further signal means at said second terminal to transmit said lastmentioned alternating current at a predetermined level as a supervisory signal over said backward signalling path to said signal receiver at said first terminal after a selected connection has been established, said lastmentioned level being maintained during any said connection and being reduced for the transmission of a backward clearing signal, each said signal receiver being responsive only to said predetermined levels of said call and said supervisory signal respectively, said predetermined levels being lower than possible peaks of voice energy transmitted over said transmission path and reaching said receivers, an attenuating pad connectable into the backward signalling path at said second terminal, a supervisory relay included in said signal means at said second terminal, and contacts of said supervisory relay included in said backward signalling path and electrically connected with said attenuating pad and operable to switch said attenuating pad out of circuit and transmit an alternating signal current from said second terminal to said first terminal.

4. In a telephone system having a first terminal, a second terminal and a transmission path including a forward and a backward signalling path between said terminals to establish selected connections between said terminals, a signal receiver at each said terminal, a source of alternating signal current and signal means at said first terminal to transmit said alternating current at a predetermined level as a call signal over said forward signalling path to signal receiver at said second terminal, said level being maintained during any said connection and being reduced for the transmission of a forward clearing signal; a further source of alternating signal current and further signal means at said second terminal to transmit said lastmentioned alternating current at a predetermined level as a supervisory signal over said backward signalling path to said signal receiver at said first terminal after a selected connection has been established, said lastmentioned level being maintained during any said connection and being reduced for the transmission of a backward clearing signal, each said signal receiver being responsive only to said predetermined levels of said call and said supervisory signal respectively, said predetermined levels being lower than possible peaks of voice energy transmitted over said transmission path and reaching said receivers, means in the receiver at said first terminal to reduce the sensitivity of said receiver, means in said backward signalling path at said second terminal to momentarily raise the level of said supervisory signal current transmitted by said further signal means at said second terminal to operate said signal receiver in said backward signalling path at said first terminal and further means associated with said lastmentioned signal receiver and operable by said operated signal receiver to increase the sensitivity of said receiver and to maintain said increased sensitivity for said supervisory signal current of said predetermined lower level during transmission from said second terminal to said first terminal.

5. In a telephone system having a first terminal, a second terminal and a transmission path including a forward and a backward signalling path between said terminals to establish selected connections between said terminals, a signal receiver at each said terminal, a source of alternating signal current and signal means at said first terminal to transmit said alternating current at a predetermined level as a call signal over said forward signalling path to said signal receiver at said second terminal, said level being maintained during any said connection; a further source of alternating signal current and further signal means including a supervisory relay at said second terminal and electrical connections from contacts of said supervisory relay to said further source of signal current and said backward signalling path to transmit said lastmentioned alternating current at a predetermined level over said backward signalling path to said signal receiver at said first terminal, an auxiliary relay operable by said supervisory relay and a resistor interposable in the connection between said lastmentioned source of signal current and said backward signalling path by said auxiliary relay to reduce the transmitted signal current, said auxiliary relay being slow to operate upon energization by said supervisory relay, a resistor in the input circuit of said signal receiver, a contact of said relay being electrically connected with said lastmentioned resistor and upon operation of said signal receiver short circuiting said resistor to increase the sensitivity of said signal receiver.

6. In a telephone system having a first carrier terminal, a second carrier terminal and a carrier transmission path including a forward and a backward signalling path between said terminals to establish selected connections between said terminals, a signal receiver at each said terminal, a source of carrier current and signal means at said first carrier terminal to transmit the unmodulated carrier at a predetermined level as a call signal over said forward signalling path to said signal receiver at said second terminal, said level being maintained during any said connections; a further source of carrier current and further signal means at said second carrier terminal to transmit said lastmentioned unmodulated carrier at a predetermined level as a supervisory signal over said backward signalling path to said signal receiver at said first carrier terminal after a selected connection has been established, said lastmentioned level being maintained during any said connection, each said signal receiver being responsive only to said predetermined levels of said call and said supervisory signal respectively, said levels being lower than possible peaks of voice energy transmitted over said transmission path and reaching said receivers, means in the receiver at said first carrier terminal to reduce the sensitivity of said receiver, means in said backward signalling path at said second carrier terminal to momentarily raise the level of said supervisory signal transmitted as unmodulated carrier by said further signal means at said second carrier terminal to operate said signal receiver in said backward signalling path at said first carrier terminal, and further means associated with said lastmentioned signal receiver and operable by said operated signal receiver to increase the sensitivity of said receiver and to maintain said increased sensitivity for said supervisory signal of unmodulated carrier of said predetermined lower level during transmission from said second carrier terminal to said first carrier terminal.

References Cited in the file of this patent

UNITED STATES PATENTS

| | | |
|---|---|---|
| 2,601,425 | Bartelink | June 24, 1952 |
| 2,610,256 | Brandt | Sept. 9, 1952 |